(12) United States Patent
Kono

(10) Patent No.: US 7,744,096 B2
(45) Date of Patent: Jun. 29, 2010

(54) SEAL DEVICE

(75) Inventor: Toru Kono, Saitama (JP)

(73) Assignee: Eagle Engineering Aerospace Co., Ltd., Tokyo (JP)

( * ) Notice: Subject to any disclaimer, the term of this patent is extended or adjusted under 35 U.S.C. 154(b) by 446 days.

(21) Appl. No.: 11/058,197

(22) Filed: Feb. 16, 2005

(65) Prior Publication Data

US 2005/0179215 A1 Aug. 18, 2005

(30) Foreign Application Priority Data

Feb. 18, 2004 (JP) ............................. 2004-040967

(51) Int. Cl.
*F16J 15/02* (2006.01)
*F01D 25/26* (2006.01)
(52) U.S. Cl. ...................... 277/644; 277/654; 415/135; 415/210.1
(58) Field of Classification Search ................ 277/637, 277/644, 654, 906; 415/135, 210.1
See application file for complete search history.

(56) References Cited

U.S. PATENT DOCUMENTS

| 3,552,753 A | | 1/1971 | Mierley, Sr. | |
|---|---|---|---|---|
| 3,838,863 A | * | 10/1974 | Rouger ......................... | 277/608 |
| 3,975,114 A | | 8/1976 | Kalkbrenner | |
| 4,537,024 A | | 8/1985 | Grosjean | |
| 4,902,198 A | * | 2/1990 | North .......................... | 415/115 |
| 5,624,227 A | * | 4/1997 | Farrell ........................ | 415/139 |
| 5,865,600 A | * | 2/1999 | Mori et al. ............... | 416/198 A |
| 5,975,844 A | | 11/1999 | Milazar et al. | |
| 6,308,960 B1 | * | 10/2001 | Peale .......................... | 277/631 |
| 6,431,825 B1 | | 8/2002 | McLean | |
| 7,128,323 B2 | * | 10/2006 | Iguchi et al. ................. | 277/644 |
| 2001/0019695 A1 | * | 9/2001 | Correia ........................ | 415/135 |

FOREIGN PATENT DOCUMENTS

| GB | 1 580 884 | | 8/1976 |
|---|---|---|---|
| GB | 2 400 144 A | | 10/2004 |
| JP | 59-070814 | | 4/1984 |
| JP | 01142075 A | * | 6/1989 |
| JP | 2003-294153 | | 10/2003 |

\* cited by examiner

*Primary Examiner*—Vishal Patel
(74) *Attorney, Agent, or Firm*—Arent Fox LLP

(57) ABSTRACT

Primary objective of the present invention is to effect a seal against a variable clearance formed between assembly components which admit flows of high temperature fluids or are subjected to vibrations. Another objective is to reduce manufacture cost thereof. The seal device is comprised of seal strip, seal strip assemblage and a joint section, wherein the seal strip retains a first seal end section at one distal end of a thin seal base strip and a second seal end section at the other distal end of said seal base strip, wherein the seal strip assemblage arranges a plurality of said seal strips and retains a first outer circumferential seal face and a second outer circumferential seal face, the first outer circumferential seal face being disposed at the outer circumference of the first seal end section, the second outer circumferential seal face being disposed at the outer circumference of the second seal end section, wherein the joint section connects the seal strip assemblage so as to form an integral structure.

8 Claims, 20 Drawing Sheets

SEAL DEVICE

BACKGROUND OF THE INVENTION

1. Field of the Invention

The present invention relates to a seal device. More particularly, this invention relates to a seal device effecting a seal against a gap between assembly components whose clearance varies under the influence of fluid pressure, thermal deformation due to hot fluid, vibratory force during rotation or the like. This invention, for example, relates to a seal device effecting a seal between assembly components such as stator or shroud of gas turbine engines.

2. Description of the Related Art

Turbine assemblies include turbine sections of steam turbines and assembly unit of compressor and turbine sections of gas turbines or the like. Turbine section 100 of a gas turbine includes moving blade assembly 110 which rotates with a rotor and stationary blade assembly which is fixed in a compartment (not shown). The moving blade assembly 110 consists of a platform 110A which is connected to the rotor and moving blades 110B. The stationary blade assembly, on the other hand, consists of stationary blades, an inner shroud and an outer shroud wherein the inner shroud and the outer shroud are fixed at the both ends of the stationary blades.

A blade surface of the stationary blade and the inner and the outer shrouds form a passage wall for high temperature gas flowing through the turbine part, and also a blade surface of the moving blade 110B and the platform 110A form a passage wall for high temperature gas. Furthermore, in the compartment, a division ring forming a passage wall for high temperature gas together with the blade surface of the certain space between a tip end of the moving blade 110B. The provision ring is formed of a plurality of division ring sections that are connected in the direction of arrangement of moving blade 110B, and forms a wall surface of a circular ring cross section as a whole.

The moving blade assembly 110 as well as the stationary blade assembly need to be arranged to tolerate thermal deformation caused by heat passing through between the blades. Also mounting of a plurality of blades on the shroud section requires the fabrication process to be straightforward. In addition, division of the parts involved is necessary in order to simplify the assembly process and to decrease the associated assembly cost. For these reasons, the moving blade assembly 110 and the stationary blade assembly are divided into a plurality of subassemblies along the circumferential direction of the rotor. That is, the platform sections 110A as well as the shroud sections, like the division ring, are arranged to include a plurality of divided pieces which are adjoined in the direction of arrangement of blade.

As related art 1 of the present invention, US. Patent No. 2002/0090296A1 discloses a seal device, as depicted in FIG. 20. A turbine section 100 which forms a turbine passage wall of a gas turbine comprises a moving blade member, not shown, which rotates together with a rotor and a stationary blade member 110, not shown, fixed in a blade compartment. The moving blade member 110A consists of a platform 110A to be connected with an end portion of the rotor and a moving blade 110B. The stationary blade member consists of a stationary blade, not shown, and an inner shroud and an outer shroud fixed to each end of the stationary blade.

A blade surface of the stationary blade and the inner and the outer shrouds form a passage wall for high temperature gas V flowing through the turbine part. Also a blade surface of the moving blade 110B and the platform 110A form a passage wall for high temperature gas V. Furthermore, in the compartment, a division ring forming a passage wall for high temperature gas V together with the blade surface of the moving blade 110B and the platform 110A is fixed while interposing a certain space between a tip end of the moving blade 110B. The provision ring is formed of a plurality of division ring sections that are connected in the direction of arrangement of moving blade 110B, and forms a wall surface of a circular ring cross section as a whole.

The moving blade member 110 and the stationary blade member suffer from thermal deformation due to exposure to high temperature gas (sealed fluid) flowing through the blades. Such a structural inconvenience caused by the thermal deformation needs to be compensated by keeping a gap between the connected assembly surfaces. Also ease of manufacture for the shrouds needs to be taken into account because several blades are mounted onto the shrouds. Further, an assembly cost will increase unless ease of assembly is taken into consideration by dividing components in an appropriate manner. For these reasons, the moving blade member 110 and the stationary blade member are divided into a plurality of sections in the peripheral direction of the rotor. That is, the shroud and the platform 110A are arranged so that a plural number of shroud sections and platform sections are connected in the direction of arrangement of blade in the same manner as the division ring.

When the shroud, platform 110A and division ring are arranged in such a manner that the shroud sections, platform sections and division ring sections are, respectively, connected in the peripheral direction of the rotor, it is necessary to keep a gap between the connected shroud sections, between the connected platform sections, between the connected division ring sections for the reason of absorbing thermal deformation. The gap is so designed to allow a sufficient space such that heat expansion will not cause severe contact and damage of the adjacent surfaces. When the high temperature gas V flows through the passage which is formed by the blade surface, shroud, and platform 110A or division ring, the high temperature gas V needs to be prevented from leaking from the gap between the connected shroud sections and the like. When the high temperature gas V leaks outside from the gap, it may cause decrease in turbine efficiency, or occurrence of unexpected failure at other portions outside the fluid passage by the high temperature gas which is burned gas.

A mounting slot is provided in side end surfaces 113, 113 of the adjacent platforms 110A, 110A, and a sealing member 102 whose frontal view is an elongated T-bar shape is provided across the two mounting slots so as to prevent high temperature gas V from leaking outside from the gap 112. The sealing member 102 is also provided across the gap between the shroud sections as well as the gap between the division ring sections. With this T-bar sealing member 102, however, a certain gap inevitably remains between the adjacent platforms 110A, 110A unless the gap completely disappears after heat expansion brings the sealing member 102 and the two side end surfaces 113, 133 into seal-tight contact. Therefore, under an ordinary circumstance, high temperature gas V will leak outside from the gap. Also although the sealing member 102 in the figure has a straight form, manufacture of a curved sealing member will be difficult. Further, when the side end surfaces 113, 113 are subjected to heat expansion beyond tolerance, the surfaces collide with each other and give damage to the sealing member 102.

The present invention is introduced to resolve the above mentioned problems. Technical problem which the present invention tries to resolve is to improve seal ability of a seal device by maintaining seal contact of seal surfaces thereof even when external forces induced by thermal stress, fluid pressure, vibratory motion or the like cause to change a gap formed between both contact surfaces which mount the seal device therebetween. Another goal is to assure seal tight installation of the seal device even against an arcuate mount surface. Yet another goal is to make manufacture and installation of the seal device straightforward, and to reduce manufacture cost and assembly cost of the components.

BRIEF SUMMARY OF THE INVENTION

The present invention is made to alleviate the above technical problems and a solution to such problems is embodied as follows.

A seal device related to the present invention comprises is a seal device for effecting a seal between a first end surface of one assembly component and a first opposing end surface of other assembly component wherein a first mount surface of a first mount space disposed at the first end surface and a second mount surface of a second mount space disposed at the first opposing end surface are brought into seal-tight contact with respective outer circumferential seal faces thereof. The seal device is comprised of seal strips, a seal strip assemblage and a joint section. The seal strip retains a first seal end section at one distal end of a thin seal base strip and a second seal end section at the other distal end of said seal base strip. The seal strip assemblage arranges a plurality of the seal strips and retains a first outer circumferential seal face and a second outer circumferential seal face wherein the first outer circumferential seal face is disposed at the outer circumference of the first seal end section and the second outer circumferential seal face is disposed at the outer circumference of the second seal end section. The joint section connects the seal strip assemblage so as to form an integral structure.

According to the seal device related to the present invention, the seal strip assemblage consists of a plurality of thin seal strips and retains a first outer circumferential seal face and a second outer circumferential seal face wherein the first outer circumferential seal face is formed at the outer circumference of the first seal end section and brought into seal-tight contact with a first mount surface, wherein the second outer circumferential seal face is formed at the outer circumference of the second seal end section and brought into seal-tight contact with a second mount surface. Therefore, the seal strip assemblage is capable of accommodating an arbitrary form, not only a straight form but also a ring form or a curve form by arranging seal strips accordingly. Further, even in case of occurrence of a gap change between assembly components due to heat stress or external force, the seal strip assemblage is able to maintain its seal ability because seal strips thereof perform elastic deformation or adjust their arrangement in accordance with the gap change between the assembly components. Seal strip can be fabricated from heat-resistive but hard-to-machine materials such as ceramics, heat-resistive steel or the like by using a forming process or press forming, thus resulting in a low manufacture cost of heat-resistive seal strip assemblage by arranging such seal strips.

BRIEF DESCRIPTION OF THE INVENTION

Described below is details of the figures of preferred embodiments of a seal device constructed in accordance with the principles of the present invention. All the figures explained below are constructed according to actual design drawings with accurate dimensional relations.

Figure 1:
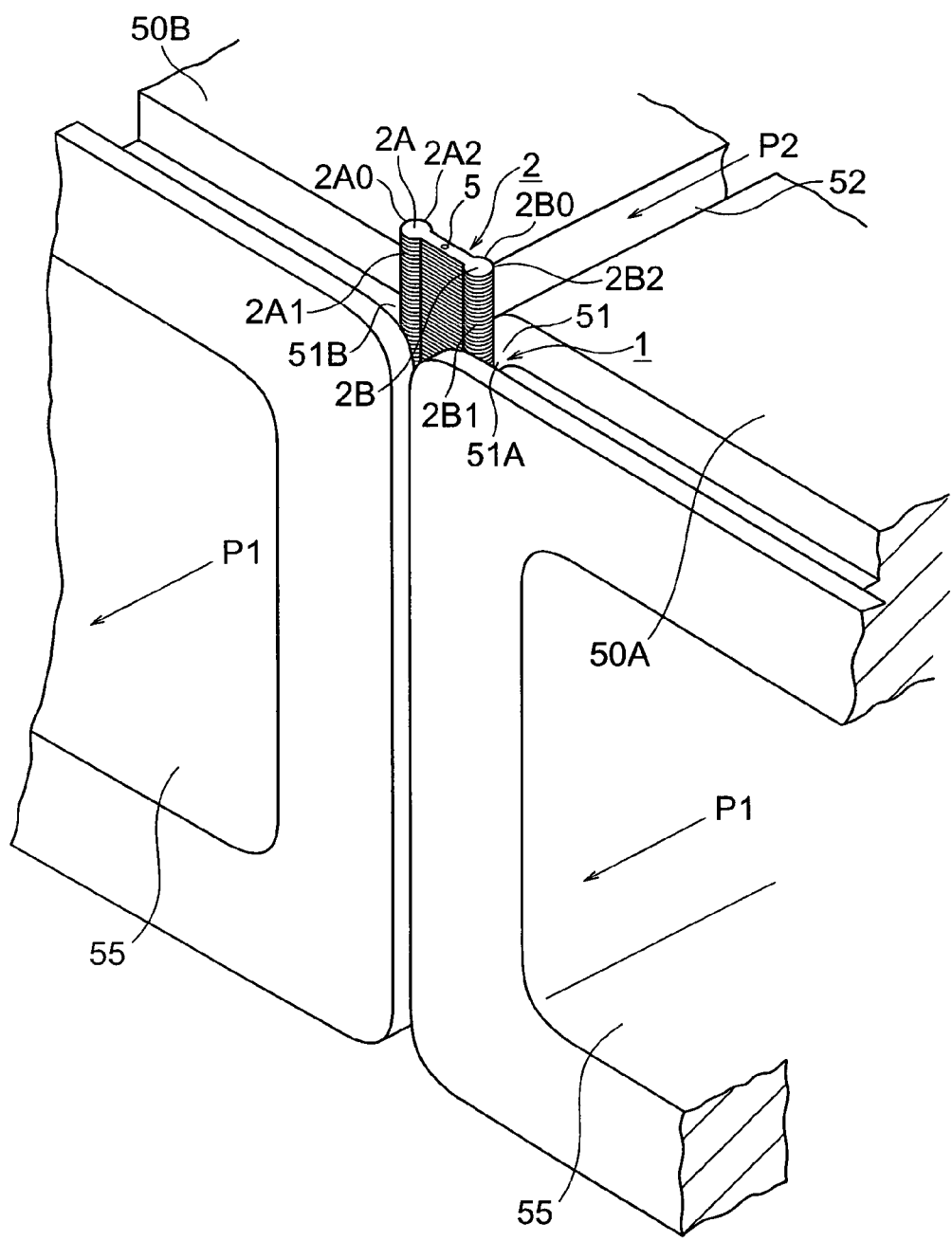
FIG. 1 is a perspective view of a first embodiment of the seal device of the present invention installed between two mount surfaces in a transition piece of a turbine.

FIG. 1 shows a seal device 1 of a preferred first embodiment related to the present invention. A gas turbine, not shown, primarily consists of an air compressor, combustor, and turbine section. Compressed air compressed by the air compressor is introduced to a combustion liner. Fuel is burned within the combustion liner to make the compressed air high temperature gas P1 which flows into the turbine section through within prismatic passage ducts (transition pieces) 50A, 50B. In FIG. 1, the individual passage ducts 50A, 50B define square cross-sectioned passages 55, 55 for to allow the high temperature gas P1 to flow therein. The prismatic passage ducts 50A, 50B for high temperature gas P1 are connected at the mating surfaces of the passage ducts 50A, 50B (to be referred to as assembly components afterward), and form a circular ring in the direction of arrangement as a whole. However, a gap is provided between the mating surfaces of the passage ducts 50A, 50B, . . . in consideration of heat expansion thereof due to high temperature gas P1. This gap serves as a passage 52 of cooling fluid P2.

Thus when high temperature gas P1 flows in the passages 55, 55 within the passage ducts 50A, 50B, the cooling fluid P1 leaks into the passages 55, 55 from the mating surfaces of the respective passage ducts 50A, 50B. Leakage of the fluid P2 causes decrease in heat efficiency of a gas turbine. Further, leakage of the fluid P2 causes gas temperature within the passage ducts 50A, 50B, . . . to be localized to high temperature or low temperature, which in turn causes material temperature of the passage ducts 50A, 50B, . . . or turbine moving blade and stationary blade and the like which are disposed downstream of the flow relative to the passage ducts 50A, 50B to locally increase or decrease, and shorten the life span of such expensive parts. Also a complicated structure of a turbine imposes difficulty in disassembly and increases its maintenance cost. To alleviate this problem, a seal device 1 is installed between mount surfaces 51A, 51B, respectively, of the passage ducts 50A, 50B, . . . .

Figure 2:
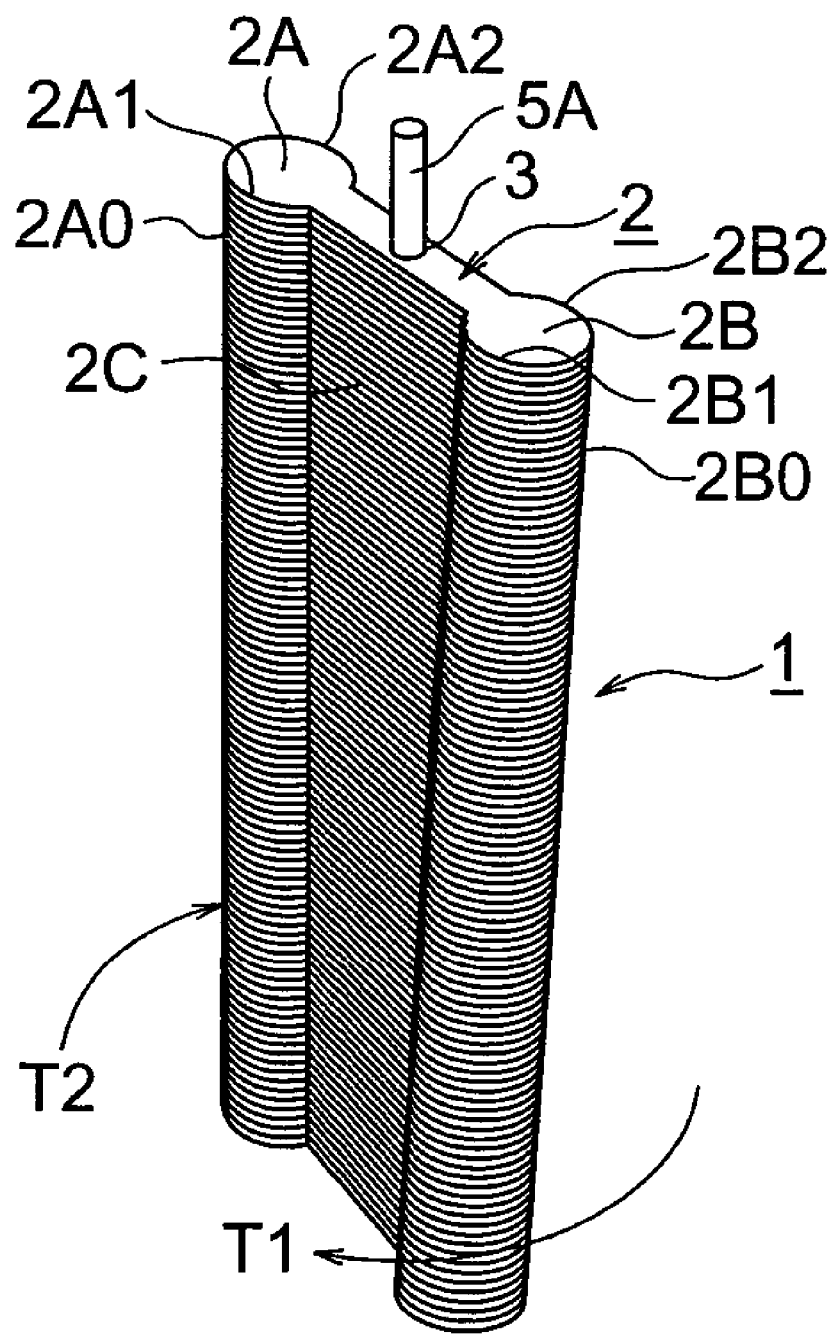
FIG. 2 is a perspective view of the seal device of FIG. 1.

FIG. 1 depicts a seal device 1 being inserted to a space formed between a first mount surface section 51A and a second mount surface section 51B and filling mounting space section 51 formed therebetween. FIG. 2 shows the outlook of the seal device 1. The illustrated upside and downside of the passage ducts 50A, 50B of FIG. 1 are connected with other components, thus preventing the sealed fluid P2 from leaking upward or downward. The first mount surface section 51A and the second mount surface section 51B are annular grooves formed in the periphery of the tip end portions of the first passage duct 50A and the second passage duct 50B. Since the passage ducts 50A, 50B are arranged to form a circular ring as a whole, adjacent first mount surface section 51A and second mounting space section 51 therebetween. A first outer circumferential seal face 2A0 and second outer circumferential seal face 2B0 of the seal device 1, respectively, are brought into seal-tight contact with mount surfaces of the mount surface sections 51A, 51B of the passage ducts 50A, 50B.

FIG. 2 shows an enlarged view of the seal device 1. It is a perspective view of the seal device 1 under assembly wherein seal strips 2 are piled. Seal strip 2 is fabricated from sheet material by press-forming or etching. The seal strip 2 has an integral structure consisting of a rectangular seal base strip 2C and a circular first seal end portion 2A which is disposed at one tip end of the seal base strip 2C. Further, a circular second seal end portion 2B also constitutes an integral member at the other tip end of the seal base strip 2C. Arranging a plurality of seal strips 2 in a close contact state defines a seal strip assemblage. The seal strip assemblage provides a through hole 3 therein, and a connection rod 5A is inserted into the through hole 3 before the both rod ends of the connection rod 5A are welded to seal strips 2. This connection rod 5A makes layers of seal strips 2 to be joined at both ends thereof in order to form a joint section 5.

In this seal device 1, the first outer circumferential seal face 2A0 consists of a first seal face 2A1 and a second seal face 2A2 as a part of circumference thereof wherein the first seal face 2A1 and the second seal face 2A2 are brought into seal contact with opposing mount surfaces formed in a groove of the first mount surface section 51A. Likewise, the second outer circumferential seal face 2B0 consists of a third seal face 2B1 and a fourth seal face 2B2 as a part of circumference thereof wherein the third seal face 2B1 and the fourth seal face 2B2 are brought into seal contact with opposing mount surfaces formed in a groove of the second mount surface section 51B. The seal device 1 is depicted in a straight form as a whole, but its variations should include an annular form or arcuate form. That is, an arbitrary form of a seal device 1 can easily be achieved according to the form of the mount surface sections 51A, 51B, . . . in the direction of groove.

Seal strip 2 and connection rod 5A are made of an anticorrosion and heat resistive material such as a nickel-based alloy. Example of such a material is 76% Ni-16% Cr-8% Fe, also known as Inconel. Inconel has high ductility and can be processed by hot/cold forming. It also has an outstanding corrosion resistance. Also as seal strip 2 and connection rod 5A prefer a heat resistive material, a good candidate material will be, but not limited to, Inconel, Hasteroy X, stainless steel sheet or rod, steel sheet or rod, aluminum sheet or rod or the like.

A seal device 1 thus formed consists of a seal strip assemblage and a connection rod 5A in which the seal strip assemblage is formed by piling a plurality of seal strips 2 and the connection rod 5A is disposed inside the through hole 3 of the seal strip assemblage and welded at its distal ends to the seal strips 2 in order to form an integral structure. Therefore, even when a relative displacement occurs between the mount surface sections 51A, 51B of the passage ducts 50A, 50B, the seal strip assemblage is able to accommodate itself to the displacement by repositioning the individual seal strips 2 in accordance with the illustrated given forces T1 and T2. Also torsional deformation given to the seal strip assemblage can be absorbed by relative sliding between mating surfaces of the adjacent seal strips, which does not induce stress onto the mating surfaces, hence no damage. Further, the first seal end portion 2A can move while the second seal end portion 2B is fixed as a fulcrum. Similarly the second seal end portion 2B can move while the first seal end portion 2A is fixed as a fulcrum. Therefore, even when the passage ducts 50A, 50B are given deformation by heat stress or fluid external force, the seal device 1 is capable of maintaining outstanding seal performance against the fluid by that the first seal face 2A1 and second seal face 2A2 as well as the third seal face 2B1 and fourth seal face 2B2, respectively, all of which have a circular form, are brought into seal-tight contact with the mount surface sections 51A, 51B. However, the first outer circumferential seal face 2A0 and second outer circumferential seal face 2B0 should not be limited to a circular form, and alternatives will include an elliptical form, a rectangle with round corners or the like.

Figure 3:
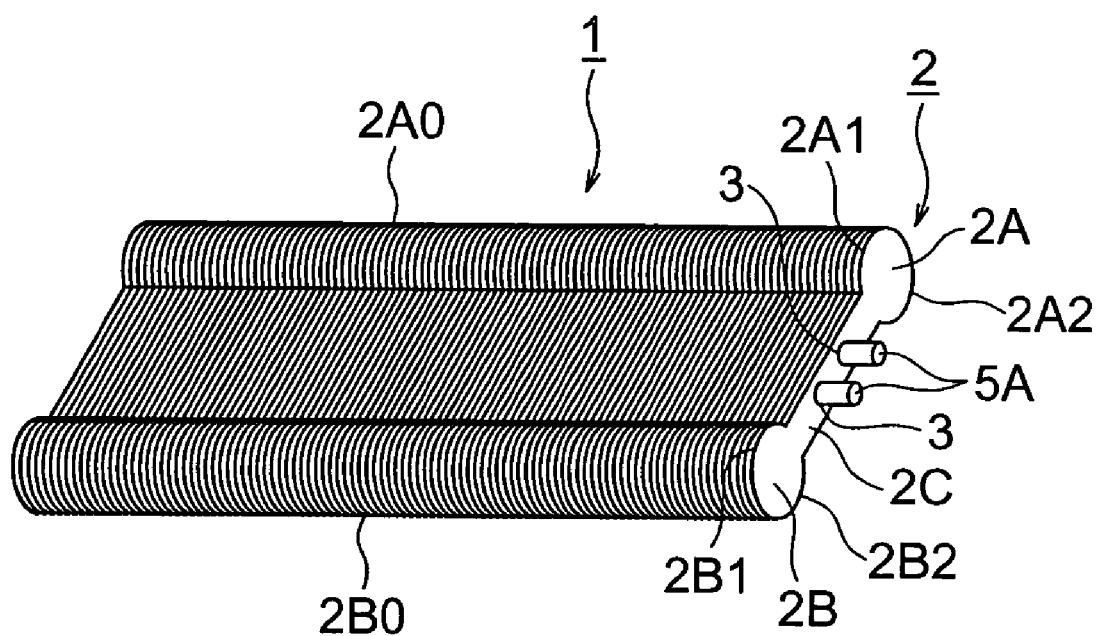
FIG. 3 is a perspective view of a second embodiment of the seal device of the present invention.

FIG. 3 is a perspective view of a second embodiment of the seal device 1 of the present invention. What makes FIG. 3 different from FIG. 2 is that in FIG. 3 there are two through holes 3, 3 disposed in a seal base strip 2C of seal strip 2 and connection rods 5A, 5A are inserted to the through holes 3, 3 before the rod ends thereof are welded to the seal strips 2 located at the distal ends of the seal strip assemblage in order to form an integral structure. The two connection rods 5A, 5A being connected at rod ends thereof with the distal end portions of seal strip assemblage defines a joint portion 5 as a whole (see FIG. 1). Other configurations are mostly similar to the seal device 1 in FIG. 2, as indicated by the same reference numerals. Connecting with the two connection rods at rod ends thereof provides the seal strip assemblage with more clamping force, thus contact state of adjacent seal strips 2 of the seal device 1 is intensified. Further, bending connection rods 5A makes it possible to easily achieve form variations of seal device 1 such as circular arc, ring form, wavy curve and so on. Also use of the two connection rods 5 enhances a torsion restoring force of the seal strip assemblage, which improves seal ability against relative displacement between the mount surface sections 51A, 51B. The connection rod 5A is preferably made of heat resistive alloy such as Inconel, Hasteroy X, stainless steel, steel or copper.

Figure 4:
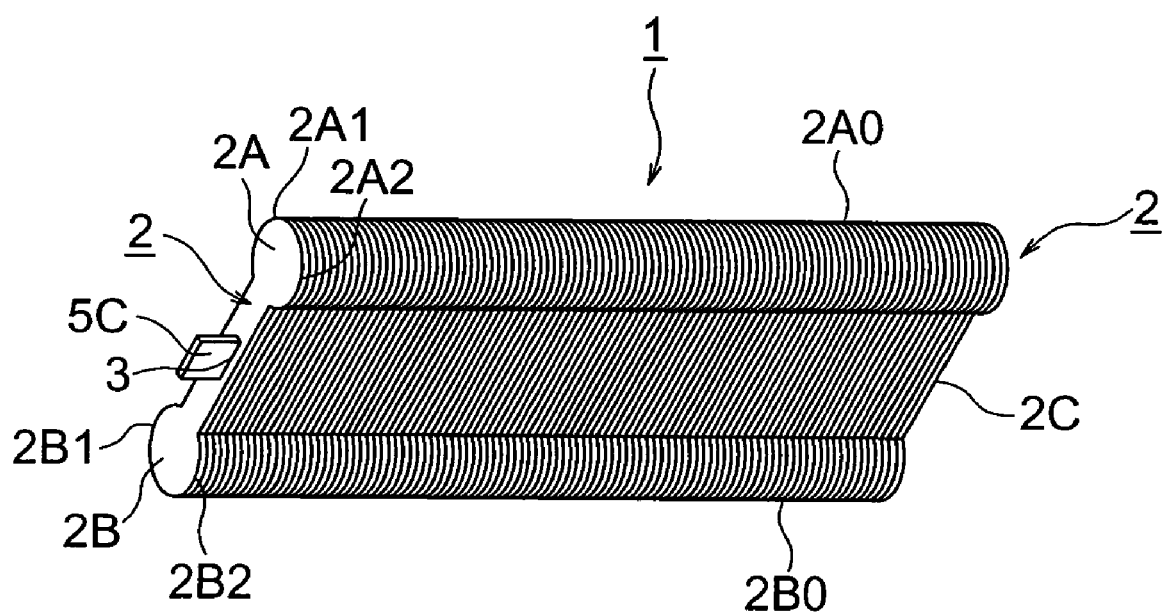
FIG. 4 is a perspective view of a third embodiment of the seal device of the present invention.

FIG. 4 is a perspective view of a third embodiment of the seal device 1 of the present invention. What makes FIG. 4 different from FIG. 2 is that a seal base strip 2C of seal strip 2 disposes a through hole 3 in a rectangular cross section form and a seal strip assemblage is assembled in such a manner that adjacent seal strips 2 are brought into a light contact state with each other. Insertion of a bar-shaped connection bar 5C into the through hole 3 of the seal strip assemblage followed by bending or welding of the end portions of the connection bar 5C provides the seal strip assemblage with an integral structure. The connection bar 5C with bar ends thereof being fixed with corresponding seal strips 2 defines a joint section 5 shown in FIG. 1. Other configurations are mostly similar to the seal device 1 in FIG. 2, as indicated by the same reference numerals. Therefore, connecting the seal strip assemblage via connection bar 5C improves a contact state of adjacent seal strips of the seal strip assemblage. Since the bar-shaped connection bar 5C is made flexible in the direction of thin wall thickness. It is straightforward to fabricate a seal strip assemblage in circular arc, ring form, or wavy curve. This connection bar 5C is preferably made of heat resistive material such as Inconel, stainless steel, cupper or the like in a bar shape.

Figure 5:
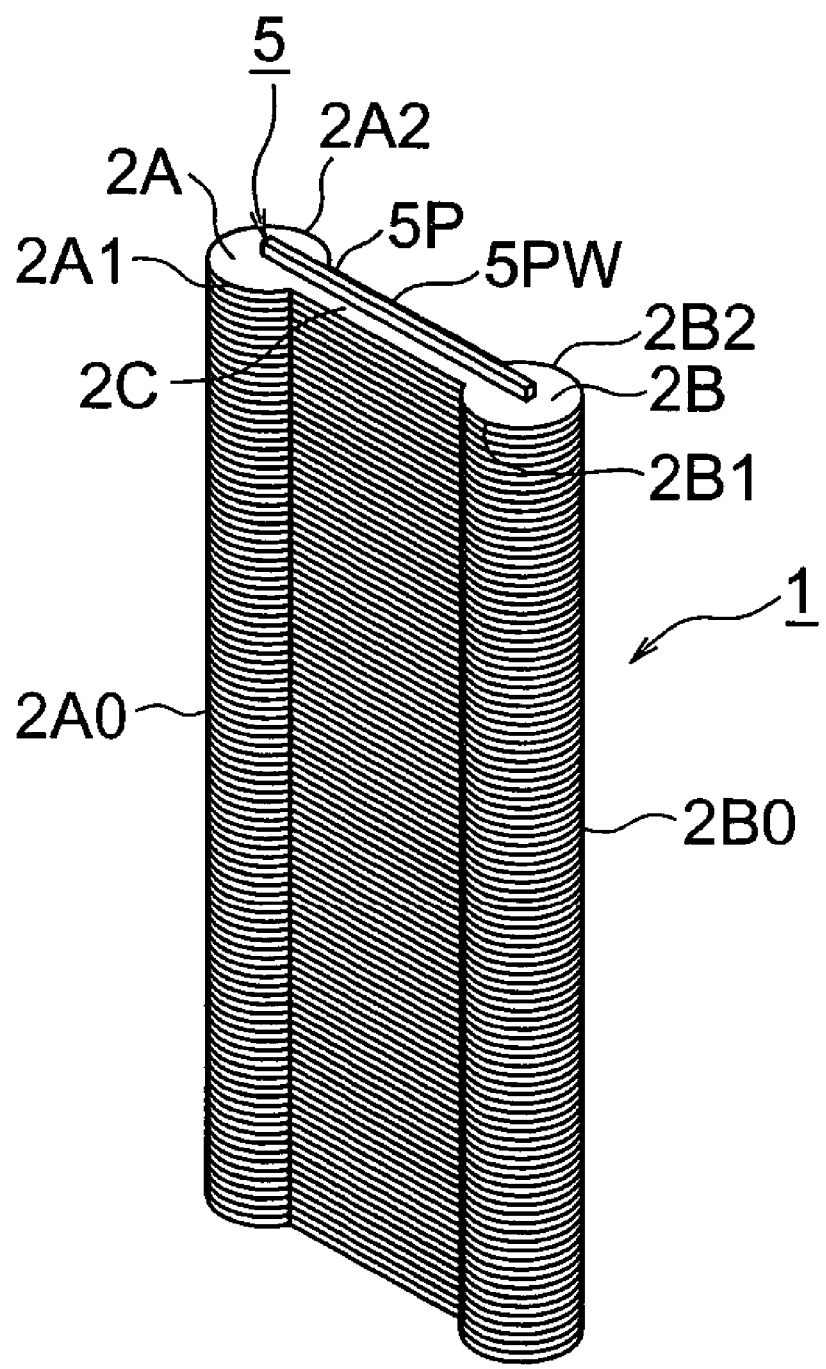
FIG. 5 is a perspective view of a fourth embodiment of the seal device of the present invention.

FIG. 5 is a perspective view of a fourth embodiment of the seal device 1 of the present invention. What makes a connection bar 5P in FIG. 5 different from a connection bar 5C in FIG. 4 is that width dimension of the connection bar 5P is substantially larger than that of the connection bar 5C in FIG. 4. A rectangular cross section of a through hole 3 for the connection bar 5P spans from a circle center of the first seal end section 2A to another circle section of the second seal section 2B of a seal base strip 2C. A plurality of seal strips 2 thus formed are arranged to constitute a seal strip assemblage in such a manner that adjacent seal strips 2 are brought into contact with each other or close proximity relative to each other. And the connection bar 5P which approximately has the same width dimension as that of the through hole 3 of the seal strip assemblage is inserted into the through hole 3. After the insertion, the tip end portions of the connection bar 5P are either welded to the seal strip 2 at the distal ends of the seal strip assemblage to form a welding joint portion 5PW or bent to form a bending joint portion 5PB (see 5PB in FIG. 6) in order to obtain an integral structure for the seal strip assemblage by means of such a joint section 5. Other configurations are mostly similar to the seal device 1 in FIG. 4, as indicated by the same reference numerals.

Figure 6:
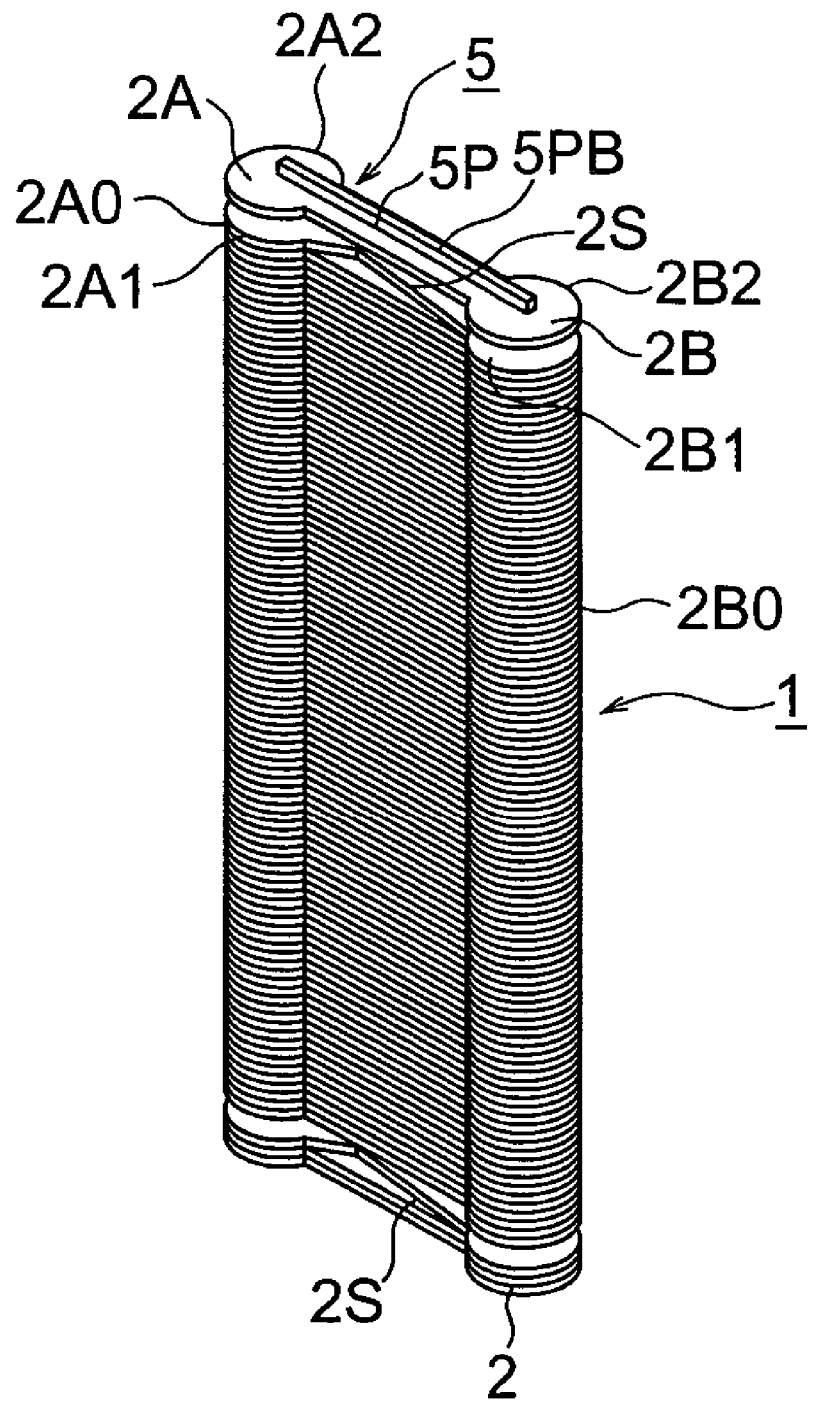
FIG. 6 is a perspective view of a fifth embodiment of the seal device of the present invention.

FIG. 6 is a perspective view of a fifth embodiment of the seal device 1 of the present invention. What makes a connection bar 5P in FIG. 6 different from a connection bar 5P in FIG. 5 is that a joint portion 5 is realized by means of bending joint portion 5PB which is formed by inflecting the tip end portions of the connection bar 5P in the direction orthogonal to width thereof. A seal strip 2 disposes a through hole 3 therein whose rectangular cross section spans from a circle center of the first seal end section 2A to another circle section of the second seal section 2B. A plurality of seal strips 2 thus formed are arranged to constitute a seal strip assemblage in such a manner that adjacent seal strips 2 are brought into contact with each other or close proximity relative to each other. The seal strip assemblage contains a spring seal strip 2S next to seal strips 2 at both distal ends. And the connection bar 5P which approximately has the same width dimension as that of the through hole 3 of the seal strip assemblage is inserted into the through hole 3. After the insertion, the tip end portions of the connection bar 5P are bent to form a bending joint portion 5PB in order to obtain an integral structure for the seal strip assemblage by means of such a joint section 5. Other configurations in FIG. 6 are more or less the same as the seal device 1 in FIG. 5, as indicated by the same reference numerals.

Seal device 1 shown in FIG. 6 enjoys flexibility of seal strip assemblage thereof owing to a resilient, urging force exerted to the assemblage by the spring seal strips 2S which are disposed at the both end portions of the seal strip assemblage. This keeps the respective seal faces 2A1, 2A2, 2B1, 2B2 of the seal strip assemblage in a seal-tight contact relation with the corresponding mount surfaces of the first mount surface section 51A and the second mount surface section 51B even when assembly components (passage ducts) 50A, 50B experience relative displacement therebetween (see FIG. 1).

Figure 7:
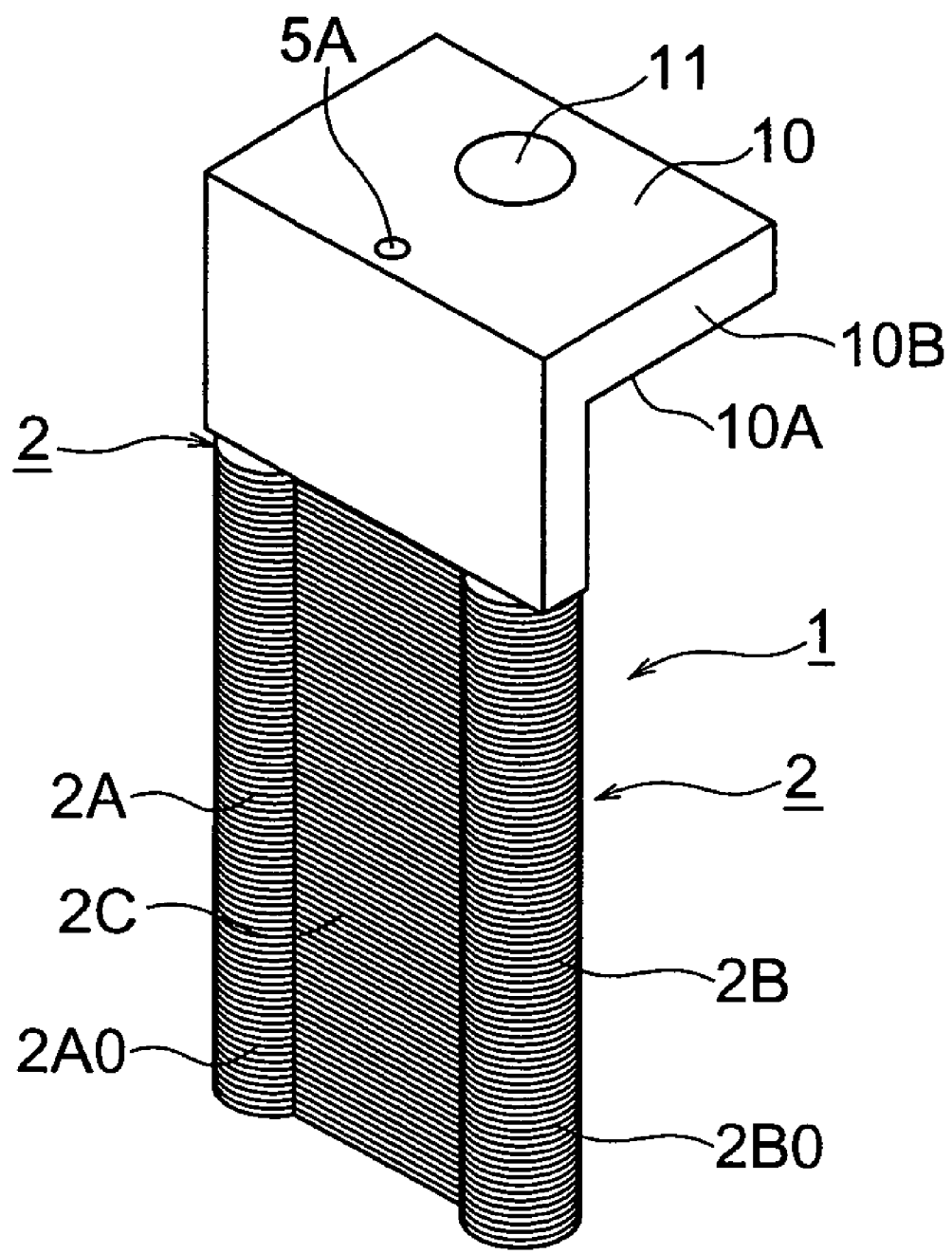
FIG. 7 is a perspective view of a sixth embodiment of the seal device of the present invention.

FIG. 7 is a perspective view of a sixth embodiment of the seal device 1 of the present invention. What makes a seal device 1 of FIG. 7 different from that of FIG. 2 is that a mounting seal plate 10 is attached to one distal end of the seal strip assemblage. The mounting seal plate 10 has a L-form with a mount bore 11 therein. Also one of the distal ends of the connection rod 5A is attached to the mounting seal plate 10. The mounting seal plate 10 consists of a mounting contact surface 10A and a mounting side surface 10B. These mounting contact surface 10A and mounting side surface 10B are used to install a seal device 1 between the assembly components (passage ducts) 50A, 50B) by attaching the mounting contact surface 10A and mounting side surface 10B to the assembly components, which virtually blocks a mounting space section 51 formed between two mount surface sections 51A, 51B. This configuration makes an installation of the seal device 1 straightforward while providing a seal for the mounting space section 51. Other configurations are mostly similar to the seal device 1 in FIG. 2, as indicated by the same reference numerals. Seal strip 2, mounting seal plate 10 and connection rod 5A are made of an anti-corrosion and heat resistive material such as a nickel-based alloy. Example of such a material is 76% Ni-16% Cr-8% Fe, also known as Inconel. Inconel, in particular, has high ductility and can be processed by hot/cold forming. It is well known for outstanding corrosion resistance. Alternative materials include Hasteroy X, stainless steel, steel, ceramics or the like.

Figure 8:
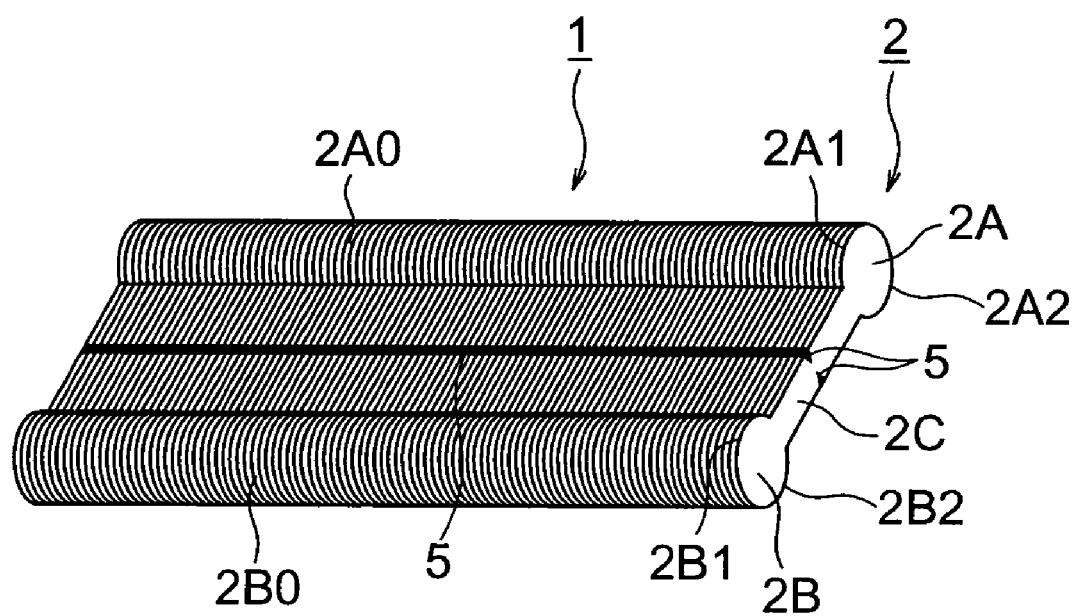
FIG. 8 is a perspective view of a seventh embodiment of the seal device of the present invention.

FIG. 8 is a perspective view of a seventh embodiment of the seal device 1 of the present invention. What makes FIG. 8 different from FIG. 2 is that the both sides of a seal strip assemblage are welded in order to define a joint section 5. This seal device 1 is suitable for obtaining a straight structure, and the respective seal strips 2 are kept in seal-tight contact state with adjacent seal strips 2. Therefore, the seal device 1 is able to exhibit outstanding seal performance against sealed fluid.

Figure 9:
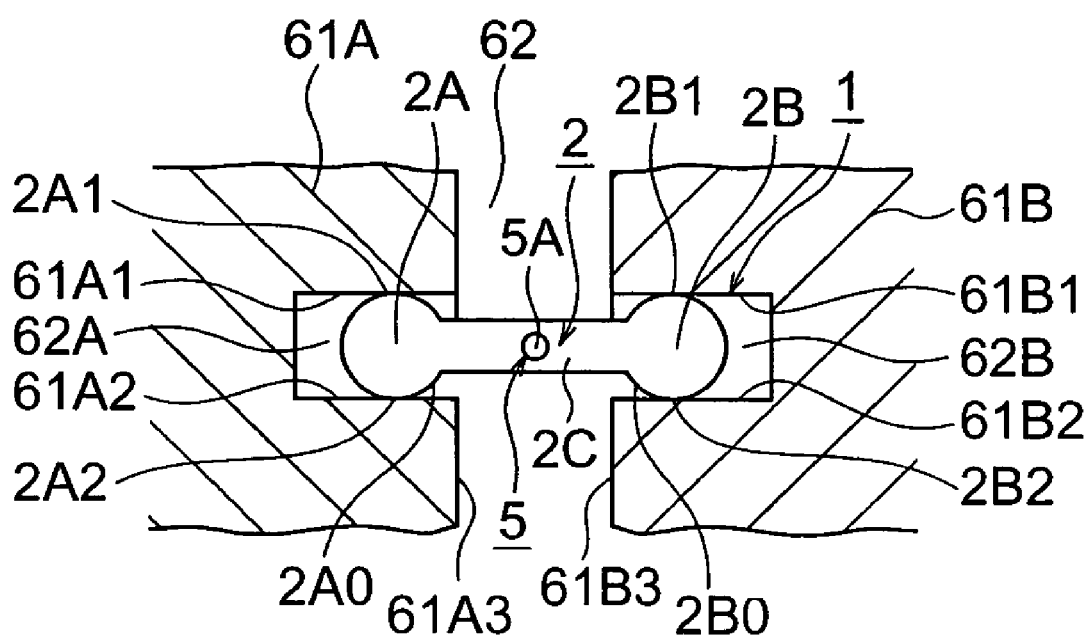
FIG. 9 is a cross-sectional view of the individual embodiment of the seal device of the present invention installed between two mount surfaces of shroud sections of a turbine.
Figure 10:
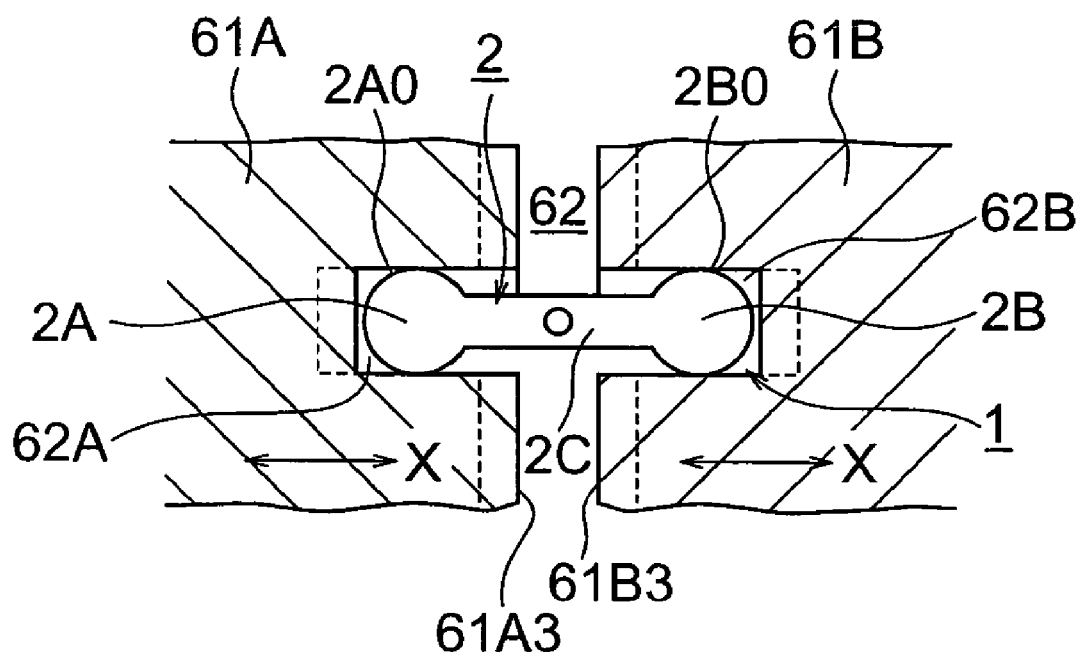
FIG. 10 is a cross-sectional view of the seal device installed between the two mount surfaces of the shroud sections of FIG. 9 in which the mount surfaces make horizontal displacement along the direction of X.
Figure 11:
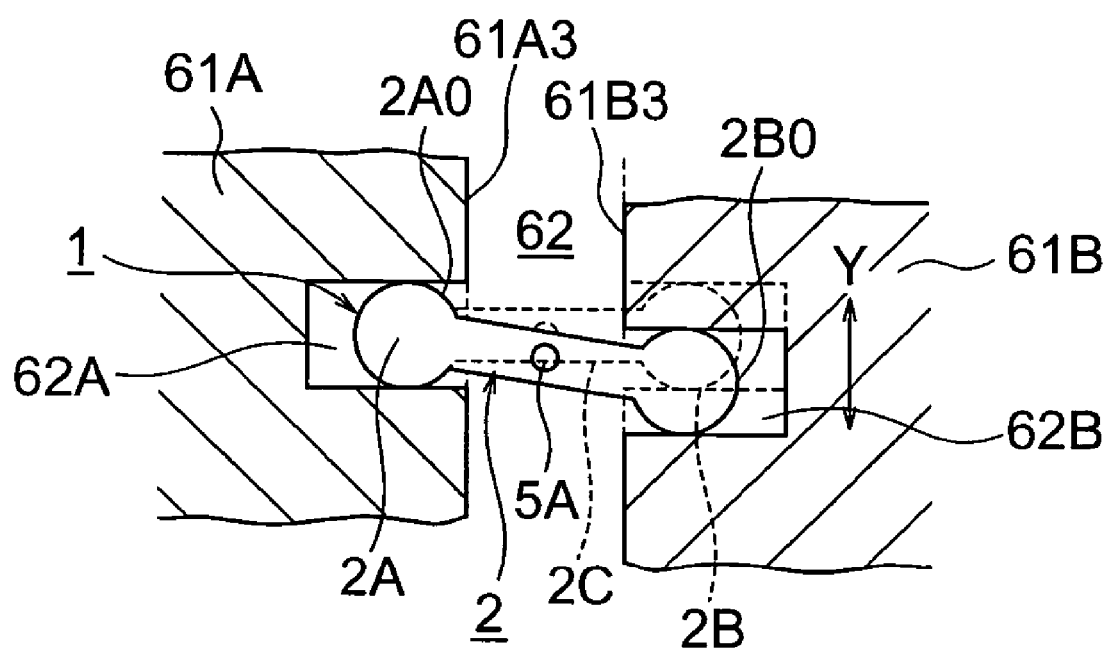
FIG. 11 is a cross-sectional view of the seal device installed between the two mount surfaces of the shroud sections of FIG. 9 in which the mount surfaces make vertical displacement along the direction of Y.

FIG. 9 to FIG. 11 show a seal device 1 being installed for blocking a gap 62 formed between a first end surface 61A3 of a first shroud segment (assembly component) 61A and a second end surface 61B3 of a second shroud segment (assembly component) 61B in a gas turbine. Seal device 1 is more or less the same as the seal device 1 in FIG. 2, as indicated by the same reference numerals. The first end surface 61A3 retains a groove-formed first mount surface section 62A in which oppositely facing side walls of the groove are defined by a first mount surface 61A1 and a second mount surface 61A2. Likewise, the second end surface 61A3 retains a groove-formed second mount surface section 62B in which oppositely facing side walls of the groove are defined by a first mount surface 61B1 and a second mount surface 61B2. The seal device 1 is deployed between the first mount surface section 62A and the second mount surface section 62B in order to block the gap 62.

And a first seal face 2A1 and a second seal face 2A2 formed on a circular first outer circumferential seal face 2A0 are brought into seal-tight contact with the first mount surface 61A1 and the second mount surface 61A2. Similarly, a third seal face 2B1 and a fourth seal face 2B2 formed on a circular second outer circumferential seal face 2B0 are brought into seal-tight contact with the first mount surface 61B1 and the second mount surface 61B2. Therefore, owing to a circular shape of the first outer circumferential seal face 2A0 and the second outer circumferential seal face 2B0, the first seal face 2A1 and the second seal face 2A2 disposed on circumference thereof are capable of keeping track of the first mount surface 61A1 and the second mount surface 61A2 without losing seal-tight contact thereagainst by adjusting contact points thereof even under an occurrence of relative displacement between the first mount surface 61A1 and the second mount surface 61A2. Likewise, the third seal face 2B11 and the fourth seal face 2B2 are capable of accommodating relative displacement between the first mount surface 61B1 and the second mount surface 61B2 while maintaining seal-tight contact thereagainst by adjusting contact points thereof.

FIG. 10 represents a departure from FIG. 9 wherein a first shroud segment (assembly component) 61A and a second shroud segment (assembly component) 61B move in the direction pointed by X, X, thus changing a gap 62 therebetween as shown by the broken lines. Even under such a circumstance, the seal device 1 is capable of keeping up by moving together in the direction X for maintaining seal-tight contact of the first outer circumferential seal face 2A0 and the second outer circumferential seal face 2B0, respectively, against the first mount surface section 62A and the second mount surface section 62B. This way, the seal device 1 can display outstanding seal ability.

FIG. 11 shows another departure from FIG. 9 wherein a first shroud segment (assembly component) 61A and a second shroud segment (assembly component) 61B have relative displacement therebetween in the direction pointed by Y. In this case, the seal device 1 also is capable of keeping up by moving together in the direction Y for maintaining seal-tight contact of the first outer circumferential seal face 2A0 and the second outer circumferential seal face 2B0, respectively, against the first mount surface section 62A and the second mount surface section 62B. The seal device 1 thus exhibits outstanding seal ability.

Figure 12:
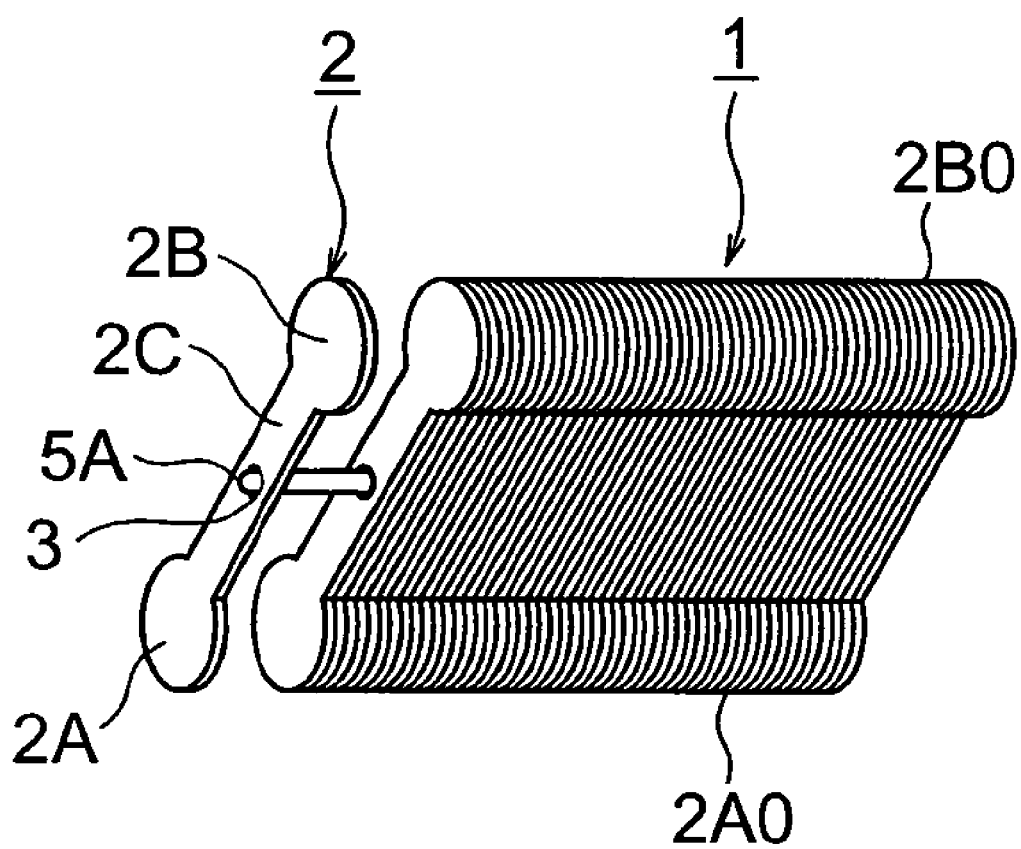
FIG. 12 is a perspective view of seal strip pieces arranged to form a seal strip assemblage in the seal device related to the present invention.

FIG. 12 illustrates how seal strips 2 are stacked up by inserting a connection rod 5A to a through hole 3 of the seal strip 2. Diameter of the through hole 3 disposed in a seal base strip 2C can be adjusted relative to the diameter of the connection rod 5A in order to keep a clearance between adjacent seal strips 2 very small. In case of obtaining a straight arrangement, the through hole 3 should preferably fit the connection rod 5A in a slidable manner.

Figure 13:
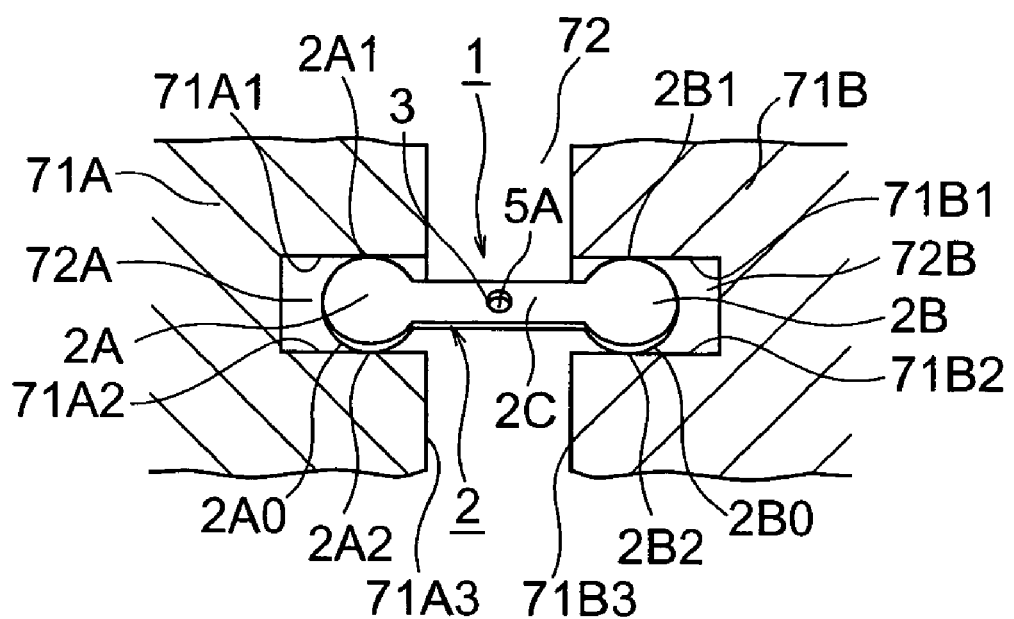
FIG. 13 is a cross-sectional view of an eighth embodiment of the seal device of the present invention installed between two mount surfaces of shroud sections of a turbine.

FIG. 13 is a cross-sectional view of an eighth embodiment of the seal device 1 of the present invention installed. In FIG. 13, the seal device 1 effectively blocks a gap 72 which is formed between a first mount component 71A and a second mount component 71B. The first mount component 71A disposes a groove-formed first mount surface section 72A therein while the second mount component 71B disposes a groove-formed second mount surface section 72B therein, facing toward each other. A pair of oppositely facing side walls of the first mount surface section 72A define a first mount surface 71A1 and a second mount surface 71A2. Likewise, a pair of side walls of the second mount surface section 72B define a first mount surface 71B1 and a second mount surface 71B2. These respective mount surfaces 71A1, 71A2, 71B1, 71B2 constitute circumferential surfaces of the annular grooves. Each of the seal strips 2 arranged to form a ring as a whole makes an angle to a radial direction of the ring. This arrangement can be realized by designing the diameter of the through hole 3 larger than the connection rod 5A such that the seal strip 2 can be tilted against the connection rod 5A. This makes it straightforward to arrange the seal device 1 in a ring form as a whole. Also tilted seal strips 2 increase the degree of contact thereof, thus improving the seal ability of the seal device 1.

Figure 14:
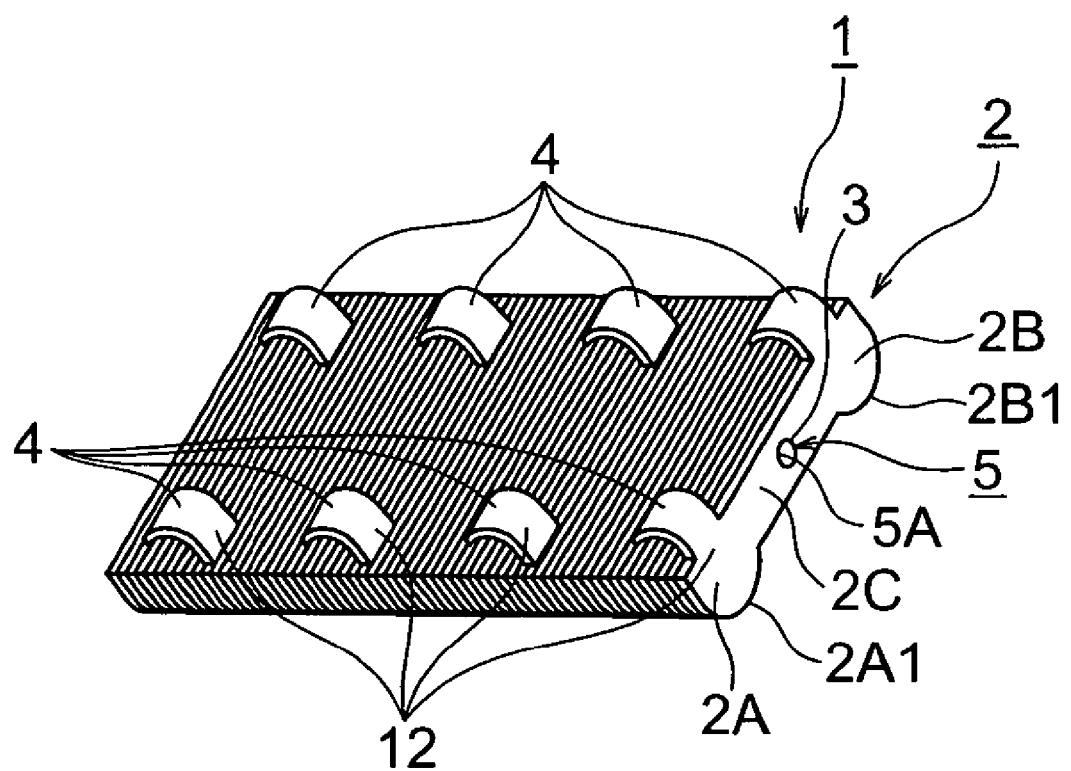
FIG. 14 is a perspective view of a ninth embodiment of the seal device of the present invention.
Figure 15:
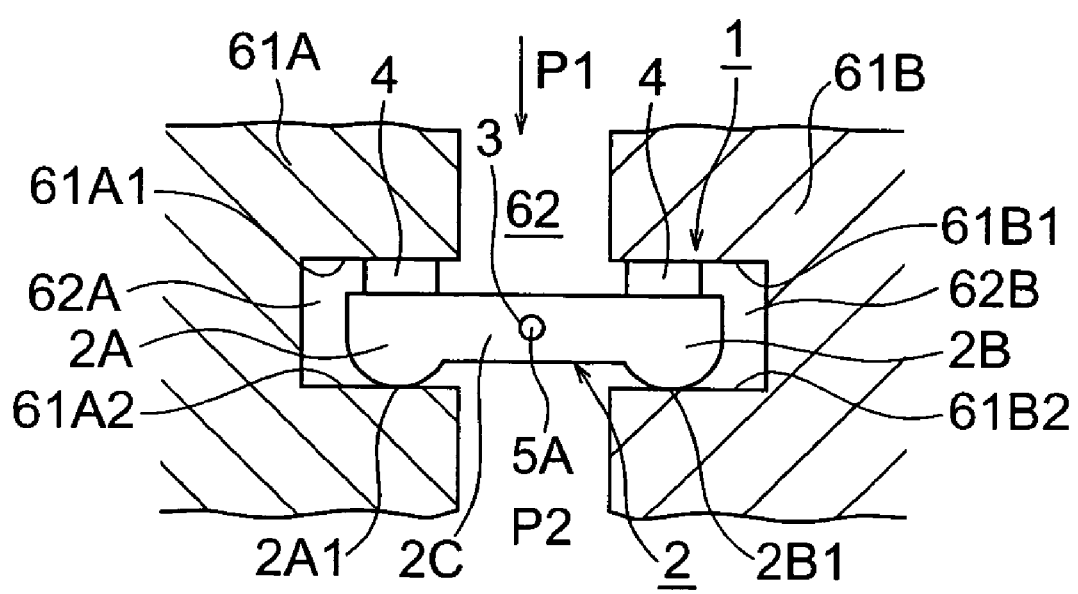
FIG. 15 is a cross-sectional view of the seal device of FIG. 14 of the present invention installed between two mount surfaces of shroud sections of a turbine.

FIG. 14 and FIG. 15, respectively, show a perspective view of a ninth embodiment of the seal device 1 of the present invention and a cross-sectional view of the seal device 1 installed. In a seal strip 2 of FIG. 14, a semi-circular first seal end section 2A is disposed at one side of one tip end portion of a seal base strip 2C while a second seal end section 2B which has the same semi-circular form as the first seal end section 2A is disposed at the same side of the other tip end portion of the seal base strip 2C. Also a through hole 3 is disposed at the mid point of the seal base strip 2C. Furthermore, a second seal strip 12 retains a first leaf spring 4 and a second leaf spring 4, respectively, on the opposite side of a first seal face 2A1 of the first seal end section 2A and a third seal face 2B1 of the second seal end section 2B. Each second seal strip 12 is inserted after every certain number of seal strips 2. FIG. 14 shows a perspective view of the seal device 1 thus arranged. The seal device 1 after arrangement retains continuously arranged first seal faces 2A1 on the semi-circular surface of the first seal end sections 2A. Similarly, the seal device 1 retains continuously arranged second seal faces 2B1 on the semi-circular surface of the second seal end sections 2B. The first leaf springs 4 are arranged in a row while the second leaf springs 4 are also arranged in a row.

A first end surface of a first assembly component 61A and an opposing second end surface of a second assembly component 61B in FIG. 15, respectively, are quite similar to the first end surface 61A3 of the first shroud segment (first assembly component) 61A and the second end surface 61B3 of the second shroud segment (second assembly component) 61B. The seal device 1 in FIG. 15 aims at blocking a gap 62. A first mount surface section 62A of the first shroud section (assembly component) 61A and a second mount surface section 62B of the second shroud section (assembly component) 61B are arranged in a similar manner to those of FIG. 9 as indicated by the same reference numerals. In the seal device 1 thus arranged, leaf springs 4 provide a first seal surface 2A1 and a third seal surface 2B1 with resilient, urging forces for seal-tight contact. This enables the seal device 1 to be installed even if an installation gap between the first mount surface section 62A and the second mount surface section 62B substantially changes. And the first seal surface 2A1 and the third seal surface 2B1 urged by the leaf springs 4 are able to maintain outstanding seal ability without any damage even under external forces caused by the gap change between the mount surface sections.

Figure 16:
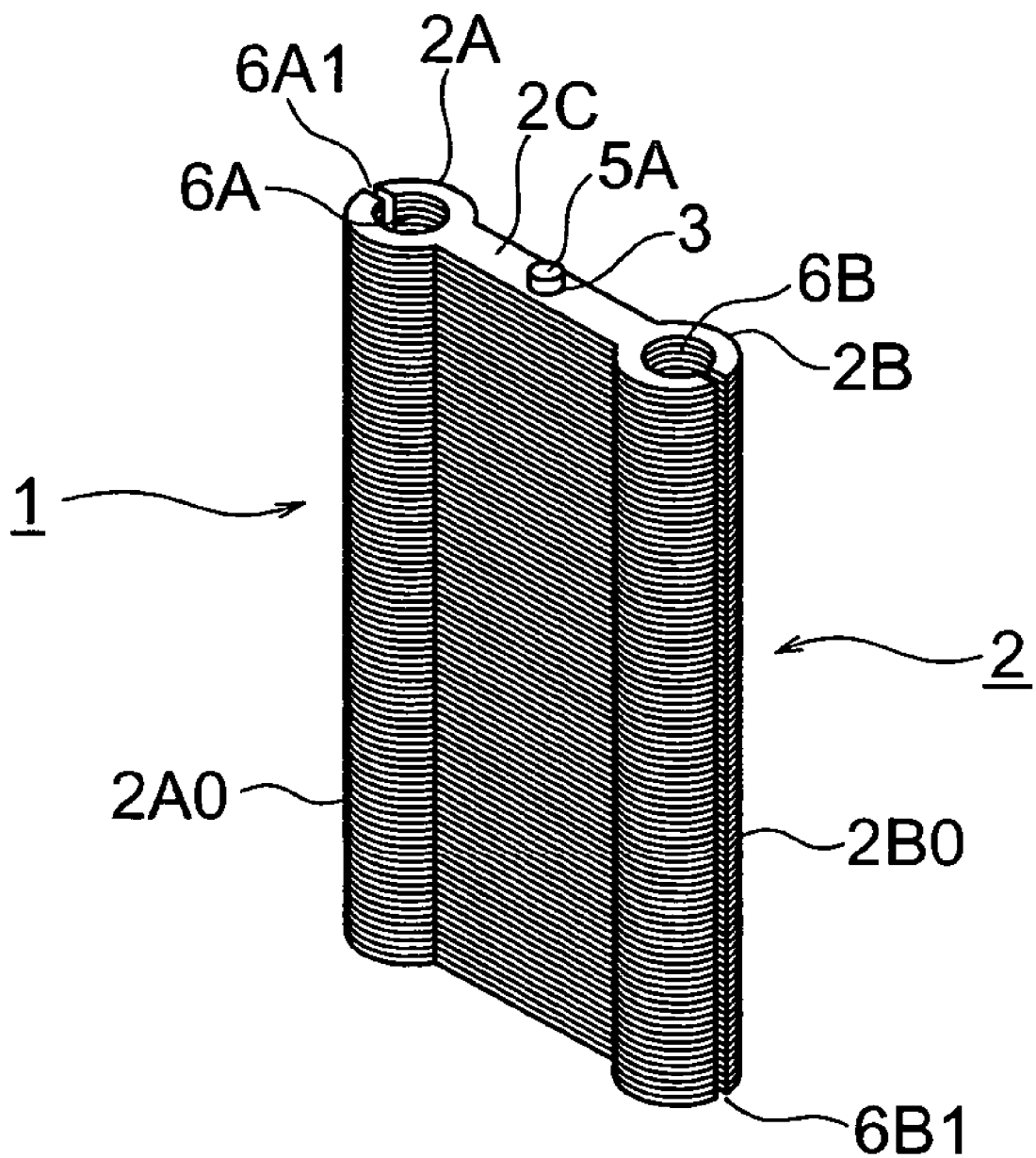
FIG. 16 is a perspective view of a tenth embodiment of the seal device of the present invention.
Figure 17:
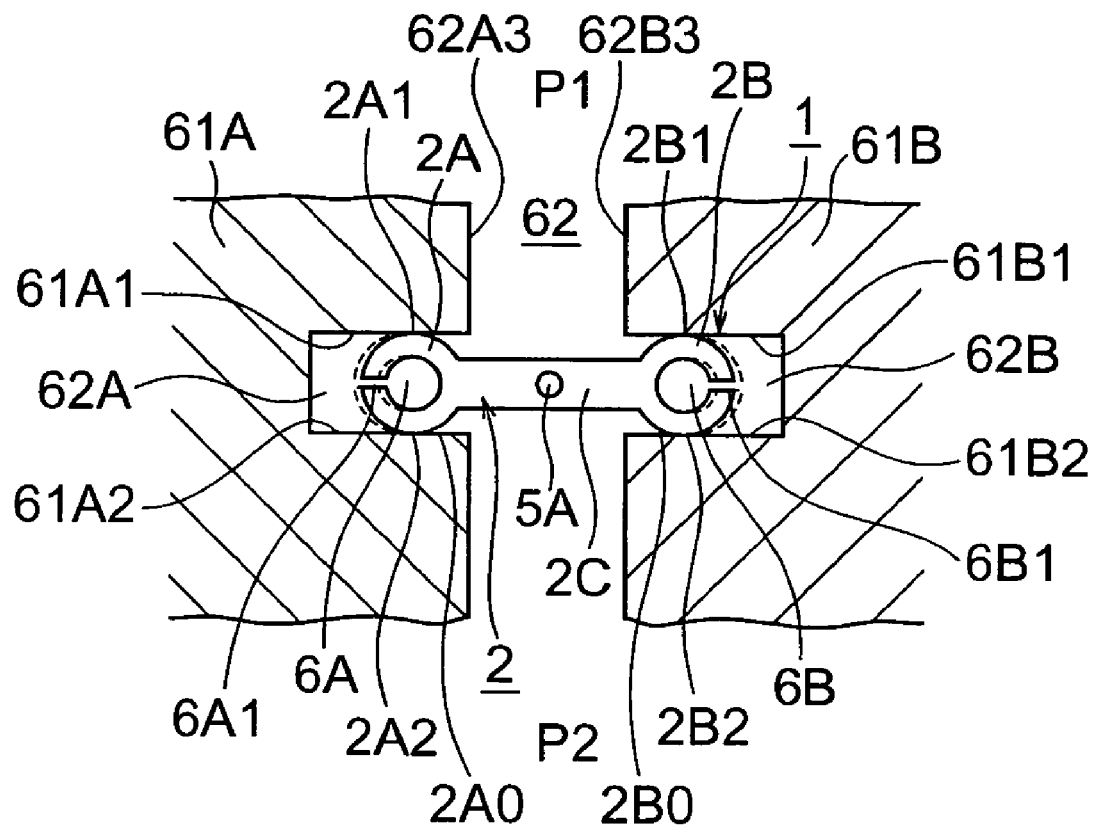
FIG. 17 is a cross-sectional view of the seal device of FIG. 16 of the present invention installed between two mount surfaces of shroud sections of a turbine.

FIG. 16 and FIG. 17, respectively, show a perspective view of a tenth embodiment of the seal device 1 of the present invention and a cross-sectional view of the seal device 1 installed. Arrangement of the seal device 1 of FIG. 16 is more or less the same as that of FIG. 2. What makes them different from each other is that the former disposes a first resilient space 6A and a second resilient space 6B, respectively, in a first seal end section 2A and a second seal end section 2B. The first resilient space 6A and the second resilient space 6B, respectively, have a first slit 6A1 and a second slit 6B1 disposed thereat in the direction of from outside to the seal base strip 2C. Because of the first resilient space 6A and the second resilient space 6B, respectively, the first seal end section 2A and the second seal end section 2B can provide a resilient force even without such slits. And the seal device 1 of FIG. 16 is installed as shown in FIG. 17. In FIG. 17, the first seal end section 2A and the second seal end section 2B change their state from the state illustrated by broken lines due to elastic deformation, and the first seal end section 2A is brought into seal-tight contact with the first mount surface 61A1 and the second mount surface 61A2 while the second seal end-section 2B is brought into seal-tight contact with the first mount surface 61B1 and the second mount surface 61B2. Configuration and functional effect of the seal device 1 is as described in FIG. 9 to FIG. 11. It is to be noted that the seal device 1 shown in the first embodiment through the ninth embodiment may as well have a first resilient space 6A and a second resilient space 6B at seal end sections 2A, 2B, respectively.

Figure 18:
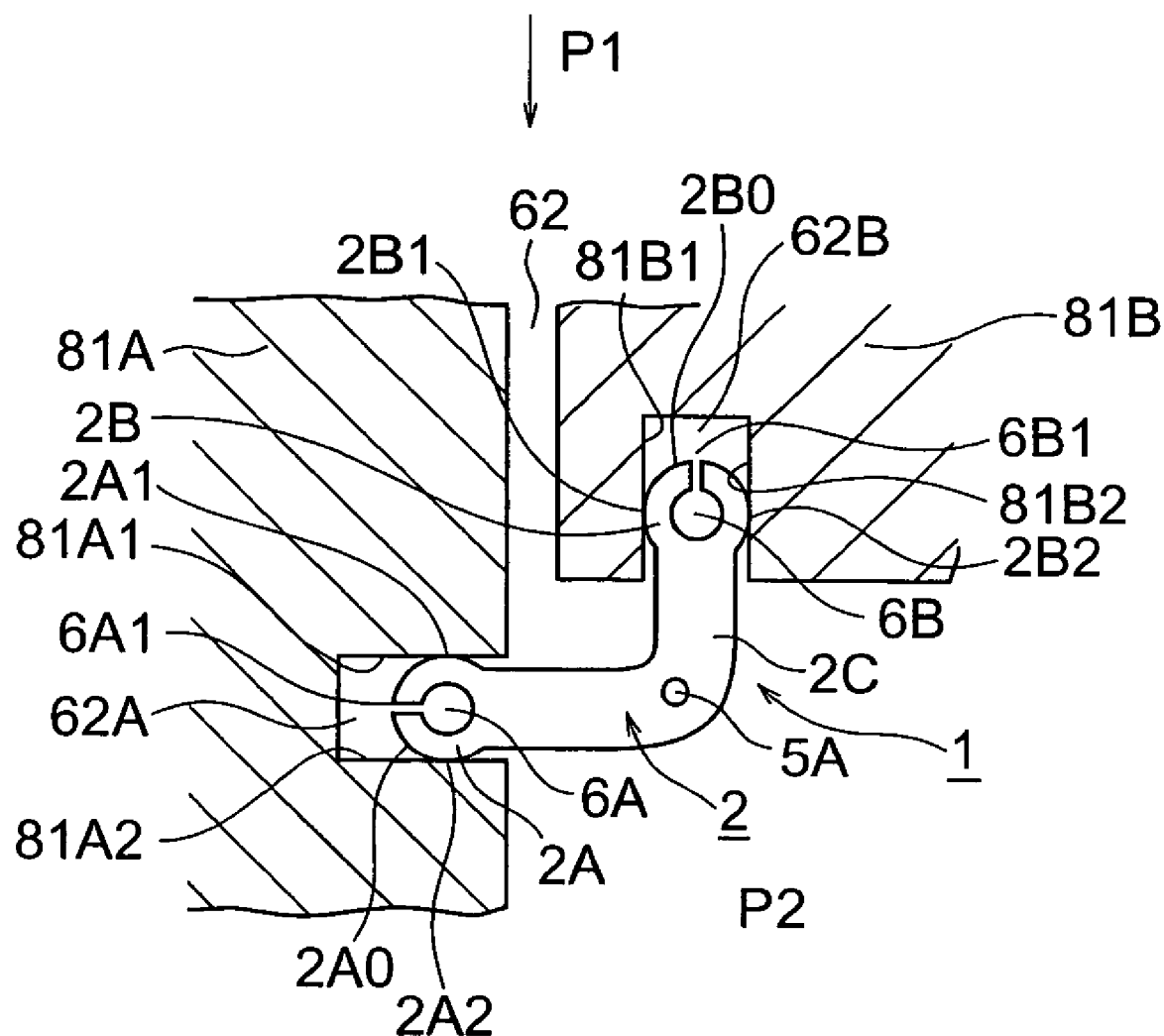
FIG. 18 is a cross-sectional view of an eleventh embodiment of the seal device of the present invention installed between two mount surfaces of assembly parts.
Figure 19:
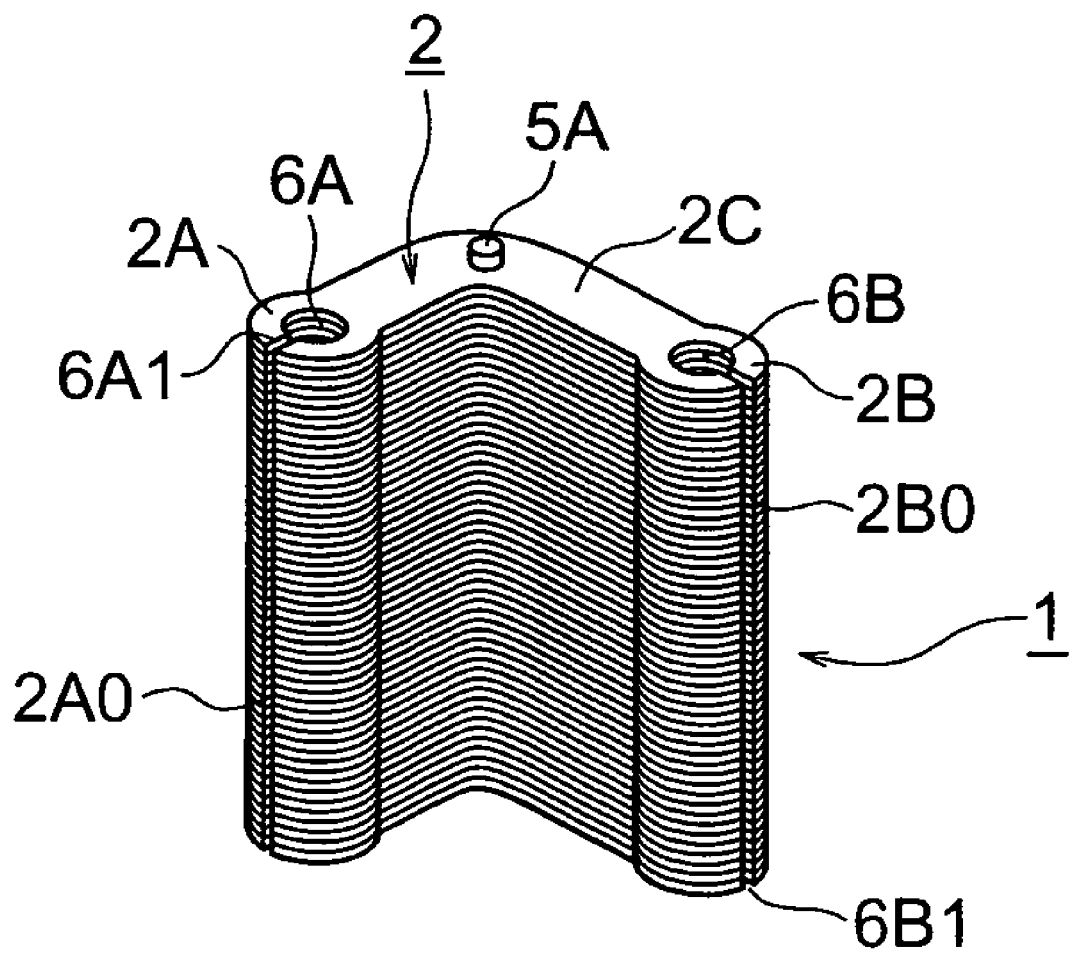
FIG. 19 is a perspective view of the seal device of the present invention shown in FIG. 18.
Figure 20:
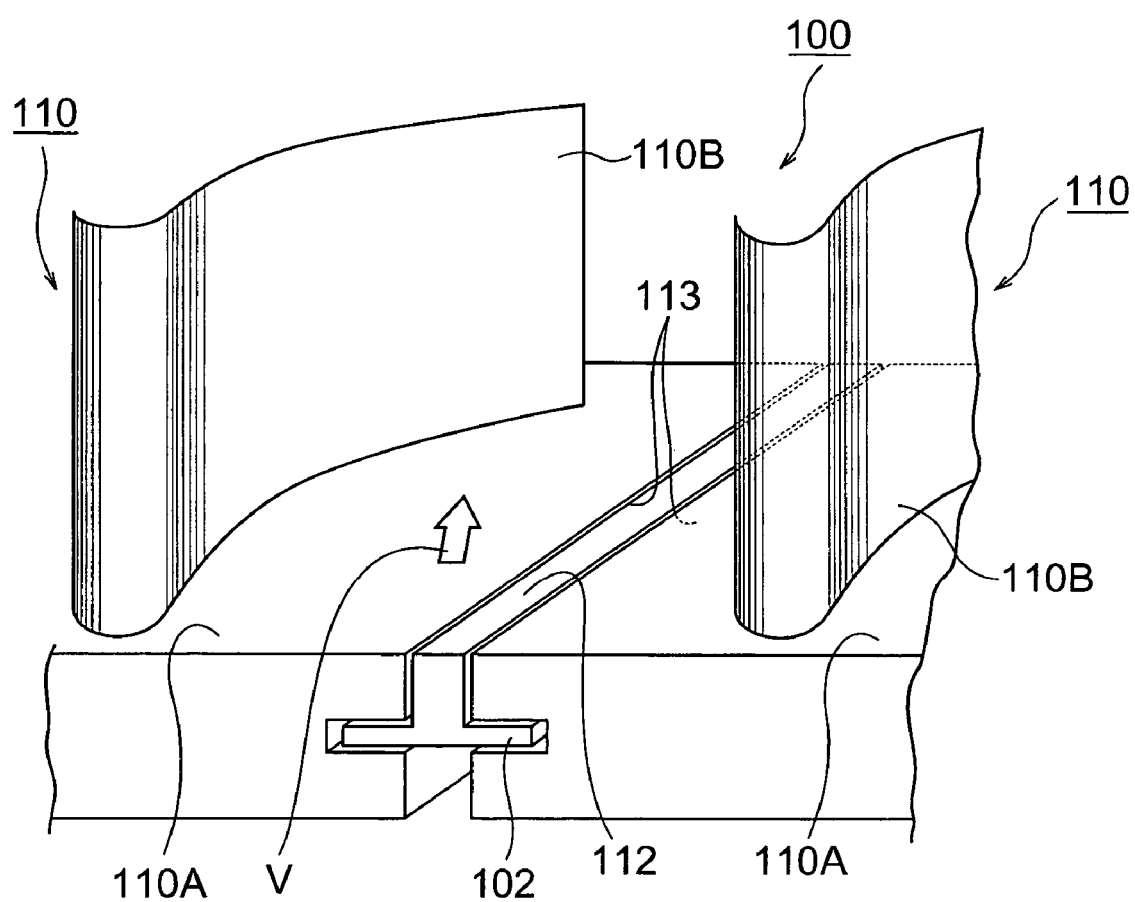
FIG. 20 is a perspective view of a seal device as a prior art related to the present invention installed between mounting grooves of platforms of a gas turbine.

FIG. 18 and FIG. 19, respectively, show a perspective view of an eleventh embodiment of the seal device 1 of the present invention and a cross-sectional view of the seal device 1 installed. Arrangement of the seal device 1 of FIG. 19 is more or less the same as that of FIG. 16. What makes them different from each other is that a seal base strip 2C is inflected by 90 degrees at midpoint thereof. And the seal device 1 is mounted at a first end surface section 62A of a first assembly component 81A and a second end surface section 62B of a second assembly component 81B, as illustrated in FIG. 18. Seal device 1 of this type is applicable when the first end surface section 62A of the first assembly component 81A and the second end surface section 62B of the second assembly component 81B are no longer in an opposing configuration. The seal device 1 in FIG. 18 and FIG. 19 brings similar functional effects as described in FIG. 9 to FIG. 11 and FIG. 17 except that the seal base strip 2C is inflected at midpoint thereof. This seal device 1 is capable of exhibiting outstanding seal performance by being disposed at a first end surface section 62A and a second end surface section 62B of assembly components 81A, 81B or the like for a gas turbine engine, nuclear plant device or the like which is subjected to high pressure, severe vibration, or heating from high temperature fluid. It is to be noted that a joint section 5 can be realized as the aforementioned connection rod 5A, connection bar 5C, connection bar 5P, bending joint portion 5PB, or welding joint portion 5PW.

Other preferred examples related to the present invention will be described next.

A seal device 1 of the second invention related to the present invention consists of a rectangular seal base strip 2C, a circular second seal end section 2B being disposed at one end of the seal base strip 2C, and a circular first seal end section 2A being disposed at the other end of the seal base strip 2C, wherein a first outer circumferential seal face 2A0 is defined at the circumference of the first seal end section 2A and a second outer circumferential seal face 2B0 is defined at the circumference of the second seal end section 2B.

In the seal device 1 of the second invention, since the first outer circumferential seal face 2A0 and the second outer circumferential seal face 2B0 have a circular form, the first outer circumferential seal face 2A0 and the second outer circumferential seal face 2B0 are always kept in seal-tight contact with the mount surfaces of a pair of assembly components to which the seal device 1 is mounted, even if the assembly components change relative distance therebetween. Because the first outer circumferential seal face 2A0 and the second outer circumferential seal face 2B0 are disposed on the circumference and individual seal strips 2, 2 are arranged in an identical form, even when the opposing mount surfaces of the assembly components are subjected to relative deformation, the respective outer circumferential seal faces 2A0, 2B0 adjust themselves so as to maintain seal-tight contact not only in the lateral direction but also in the direction of extension of the seal strip assemblage.

Seal device 1 of the third invention related to the present invention disposed a first resilient space 6A and a second resilient space 6B which are through bores fabricated in a first seal end section 2A and a second seal end section 2B, respectively.

The seal device 1 of the third invention disposes the first resilient space 6A and the second resilient space 6B, respectively, inside the first seal end section 2A and the second seal end section 2B in order to provide the first seal end section 2A and the second seal end section 2B with resilient forces. Therefore, the third seal face 2B1 and the fourth seal face as well as the first seal face 2A1 and the second seal face 2A2 are kept in seal-tight contact relation with the respective mount surfaces of mating assembly components. Furthermore, relative displacement between opposing mount surfaces of mating assembly components not only does not affect seal ability of the seal device 1 because of the continuous seal-tight contact of the first seal end section 2A and the second seal end section 2B against mating mount surfaces as the result of elastic deformation of the first resilient space 6A and the second resilient space 6B, respectively, but also does not cause damage to the seal device 1.

A seal device 1 of the fourth invention related to the present invention disposes a joint section 5 in which a connection bar 5C, 5P or connection rod 5A extends through a through hole 3 that is disposed within a seal strip assemblage and both tip end portions of the connection bar 5C, 5P or connection rod 5A are connected with the seal strip assemblage.

In the seal device 1 of the fourth invention, since the joint section 5 is arranged in such a way that the connection rod 5A or connection bar 5C, 5P extends through the through hole 3 of the seal strip assemblage and both tip end portions thereof are integrally connected with the seal strip 2, merely bending the connection rod 5A or connection bar 5C, 5P along the direction of extension can achieve an arbitrary shape as a whole such as a circular arc, S-shape or the like. The first outer circumferential seal face 2A0 and the second outer circumferential seal face 2B0 disposed on the circumferential surfaces allow the seal strip assemblage to keep seal-tight contact against the opposing mount surfaces. Further, even if a gap formed between two assembly components varies, the first outer circumferential seal face 2A0 and the second outer circumferential seal face 2B0 are capable of adjusting themselves to the deformation of the assembly components with respect to the connection rod 5A or connection bar 5C, 5P for maintaining seal-tight contact. Also in order to arrange a seal device 1 in a ring form as a whole, fabricating a through hole 3 at an angle relative to a seal strip 2 makes it possible to arrange the seal strips 2 at an angle after inserting the connection rod 5A or connection bar 5C, 5P into the through hole 3. And the seal strips 2 thus arranged are able to accommodate further tilt thereof caused by deformation of the mount surfaces of the assembly components, which effectively prevents damage to the seal strips 2 thereby. Also a possible formation of a gap between the mating surfaces of adjacent seal strips 2 can be sealed by the connection bar 5C, 5P, thus seal ability of the seal device 1 assured.

Seal device 1 of the fifth invention retains in seal strip assemblage thereof a first seal strip 2 and a second seal strip 12, wherein the first seal strip 2 disposes semi-circular first seal end section 2A and second seal end section 2B at the distal sides of the seal base strip 2C, wherein the second seal strip 12 disposes semi-circular first seal end section 2A and second seal end section 2B at the distal sides of the seal base strip 2C, first leaf springs 4 and second leaf springs 4, wherein first leaf springs 4 are disposed on the opposite surface to the first seal face 2A1 of the first seal end section 2A of the seal base strip 2C, wherein second leaf springs 4 are disposed on the opposite surface to the third seal face 2B1 of the second seal end section 2B of the seal base strip 2C, wherein each second seal strip 12 is inserted after every plural number of first seal strips 2.

In the seal device 1 of the fifth invention, the seal strip assemblage includes the first seal strip 2 which disposes the semi-circular first seal end section 2A and second seal end section 2B to the side of the seal base strip 2C. Further, the seal strip assemblage includes the second seal strip 12 which disposes the semi-circular first seal end section 2A and second seal end section 2B to the side of the seal base strip 2C, first leaf springs 4 and second leaf springs 4, wherein the first leaf springs 4 are formed on the opposite side of the first seal face 2A1 of the first seal end section 2A of the seal base strip 2C while the second leaf springs 4 are formed on the opposite side of the third seal face 2B1 of the second seal end section 2B of the seal base strip 2C. The first seal strip 2 and the second seal strip 12 are arranged in such a way that one or two pieces of the second seal strips 12 are inserted after every certain distance (band gap) of the first seal strips 2.

The first leaf spring 4 resiliently urges the first seal face 2A1 to the first mount surface. Likewise, the second leaf spring 4 resiliently urges the third seal face 2B1 to the second mount surface. This enables the seal device 1 to be installed between the opposing mount surfaces regardless of a dimensional error therebetween, large or small, and the first leaf spring 4 and the second leaf spring 4 are capable of resiliently bringing the first seal face 2A1 and the third seal face 2B1 into seal-tight contact against the respective mount surfaces. Further, despite a large gap 62 formed between a pair of assembly components, the first leaf spring 4 and the second leaf spring 4 provides the first seal face 2A1 and the third seal face 2B1 with a resilient urging force so as to keep up with such a large deformation of the components. As the result, the seal device 1 exhibits outstanding seal ability against mount surfaces which are subjected to deformation due to heat stress, external force or the like.

As described above, the seal device of the present invention can effectively be used at connections between mount surfaces of assembly components of generic machines which require sealing against a hot and high pressure fluid. In particular, a seal device of this kind is effective for the use of the mounting slots of gas turbine engines, nuclear devices or the like which are subject to thermal stress or vibration caused by the hot and high pressure fluid. Also its low production cost brings an additional advantage to this seal device.

Having described specific embodiments of the invention, however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

What is claimed is:

1. A seal device for effecting a seal between a first end surface of a first assembly component and a first end surface of a second assembly component opposing said first assembly component, wherein a first mount surface of a first mount space defined along said first end surface of said first assembly component and a second mount surface of a second mount space defined along said first end surface of said second assembly component oppose along a longitudinal axis extending from a first end of the first and second assembly components to a second end of the first and second assembly components opposing the first end of the first and second assembly components, the seal device comprising:

a seal strip assemblage formed by a plurality of seal strips comprising at least first, second and third seal strips, each seal strip comprising a base, a left end of the base having a first circular seal end, and a right end of the base opposite the left end having a second circular seal end;

wherein the base, the first circular seal end, and the second circular seal end of each of the first, second and third seal strips includes a front surface parallel to a back surface, the first, second and third seal strips being arranged sequentially relative to each other along the longitudinal axis, wherein the back surface of the base, the first circular seal end and the second circular seal end of the first seal strip matingly engages the front surface of the base, the first circular seal end and the second circular seal end of the second seal strip, and the back surface of the base, the first circular seal end and the second circular seal end of the second seal strip matingly engages the front surface the base, first circular seal end and second circular seal end of the third seal strip, the base of each of the first, second and third seal strips including an aperture defined therein and extending from the front surface to back surface, and wherein a connection bar or connection rod extends through the aperture in the base of each of the first, second and third seal strips in a direction that is parallel relative to the longitudinal axis, the longitudinal axis extending from the front surface of the first seal strip to the back surface of the third seal strip, the connection bar or connection rod providing the mating first, second and third seal strips torsional flexibility about the longitudinal axis.

2. The seal device as claimed in claim 1, wherein an outer peripheral surface of the first seal end of each of the first, second and third seal strips defines a first outer circular seal face and an outer peripheral surface of the second seal end of each of the first, second and third seal strips defines a second outer circular seal face, the first and second outer circular seal faces sealingly engaging the first and second mount surfaces, respectively.

3. The seal device as claimed in claim 1, wherein end sections of said connection bar or said connection rod are connected with said seal strip assemblage.

4. The seal device as claimed in claim 1, wherein said aperture defined in said base of each seal strip is aligned with an aperture defined in said base of said neighboring seal strip.

5. The seal device as claimed in claim 1, wherein upper and lower surfaces of the base of each seal strip connects the first circular seal end to the second circular seal end.

6. The seal device as claimed in claim 5, wherein at least one of the upper and lower surfaces of the base is planar.

7. The seal device as claimed in claim 5, wherein at least one of the upper and lower surfaces of the base is V-shaped.

8. The seal device as claimed in claim 1, wherein at least one of the first and second circular seal ends has a mouth defined therein, and wherein the at least one of the first and second circular seal ends having a C-shape.

* * * * *